Feb. 4, 1941.    G. O. BENSON    2,230,229
FISH POLE
Filed May 2, 1936
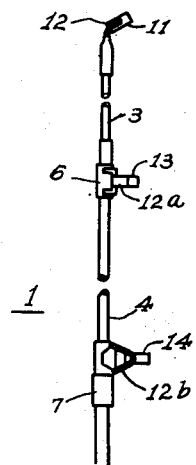
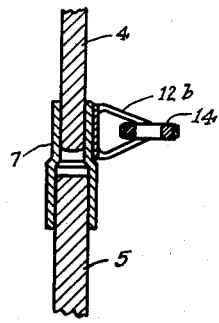
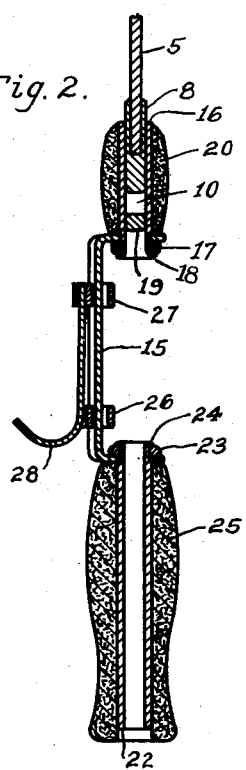
INVENTOR.
GEORGE O. BENSON
BY
ATTORNEY.

Patented Feb. 4, 1941

2,230,229

UNITED STATES PATENT OFFICE 2,230,229

FISH POLE

George O. Benson, Niagara Falls, N. Y.

Application May 2, 1936, Serial No. 77,540

3 Claims. (Cl. 43—18)

This invention relates to fish poles and has for its object the provision of a fish pole that is inexpensive to manufacture. More particularly, this invention relates to fish rods having a metal blade or rod.

It is well known in the art that the blade of a fish pole must have a greater degree of flexibility at the tip portion than at the handle portion and that the flexibility of the portion between the tip portion and the handle portion must be between that of the tip portion and that of the handle portion.

It has been the practice, heretofore, to make the metal blade or rod of a fish pole either of solid metal or of tubular metal and, in either case, tapering from the handle portion to the tip portion. By so making the blade or rod, a product results that has the range of flexibility from base to tip that is so necessary to give the desired balance and feel sought for by fishermen.

The formation of tapered blades of solid metal by the usual methods employed, namely, forging, grinding, or machining, from a continuous length of metal rod, is expensive and has prevented such rods from acquiring the popularity they would have were they not so expensive. Likewise, tapered tubular blades have been of limited popularity because they have been made from continuous lengths of tubing by drawing or by swaging, and these methods are expensive.

I have found that a very satisfactory blade or rod can be made by uniting a plurality of sections of different cross-sectional areas so that the cross-sectional area of the tip section is less than that of the handle section.

I have found also that the various sections of the blade or rod can be made at small cost and can be inexpensively and satisfactorily joined by means of sleeves or ferrules fitting over the end portions of the sections to be joined.

I have found also that the blade or rod and the handle therefor can be suitably joined for use by providing a socket in the handle and an enlarged portion at the handle end of the blade or rod that will closely fit the socket provided therefor in the handle.

Reference to the annexed drawing is made in order that a better understanding of my invention may be obtained. In the drawing, Fig. 1 is an assembly view of a fish pole made in accordance with my invention;

Fig. 2 is a longitudinal cross-sectional view of a handle and a portion of a blade embodying my invention; and Fig. 3 is a longitudinal cross-sectional view of a portion of a blade made according to my invention.

In Fig. 1 there is illustrated a fish pole embodying my invention and comprising a blade or rod 1 and a handle 2 for said blade or rod. The blade 1, as illustrated, is made up of three sections 3, 4, and 5; the tip section 3 being joined to the intermediate section 4 by a sleeve or ferrule 6; and the intermediate section 4 being joined to the base or handle section 5 by a sleeve or ferrule 7.

It will be noted that the tip section 3 is thinner than the intermediate section 4, that is, the tip section is of smaller cross-sectional area than that of the intermediate section 4. It will be noted also that each section is of uniform thickness; that is, of uniform cross-sectional area.

It will be noted also that the base or handle section 5 has an enlarged portion 8 adjacent the handle 2. This enlarged portion 8, which fits slidably but snugly into a socket 10 provided in the handle as illustrated in Fig. 2 is integrally united to the blade section 5 by swaging or other similar method.

In the preferred embodiment of my invention I make the sections 3, 4 and 5 of the blade or rod of oil tempered high carbon (0.85% to 1.00%) steel having a tensile strength of from about 200,000 to 300,000 pounds per square inch. Steel of this specification has the necessary strength and flexibility so that the blades made therefrom can be made sufficiently light in weight and be strong and whippy and of good balance. Each section is of uniform cross-sectional area and is held to a tolerance of minus nothing (—0) and plus one one-thousandth (+.001) of an inch. These close tolerances (the usual tolerance being plus or minus two one-thousandths (±.002) of an inch) are necessary in order to avoid difficulties in the assembly of the sections with their respective sleeves or ferrules.

In the preferred embodiment of my invention I make the sections 3, 4 and 5 of circular cross-section although they may be made of any desired shape, such as hexagonal. Circular and hexagonal cross-sectional rods are less expensive than other shapes and therefore are preferred.

The number of and lengths of the various sections, as well as the thickness, can be varied to give any desired character of flexibility or whip. Thus, if it is desired to have the base or handle portion 5 relatively stiff, it can be made of a heavier material than in the case in which a whippy base portion is desired. Also, if it is desired to have the blade or rod whippy throughout but of considerable flexibility at the tip portion, this can be accomplished by making the tip portion relatively long and of relatively small cross-sectional area with respect to the other sections.

I have found that for what is known as bait casting a blade made of three sections measuring eighteen (18), sixteen (16) and twelve (12) inches in length and of approximately one hundred ninety-two one-thousandths (.192), one hundred forty-eight one-thousandths (.148), and one hundred twenty one-thousandths (.120) inch respectively in diameter and of oil tempered high carbon steel as described above is very satisfactory. Obviously, more sections can be used if desired, either to produce a longer blade or rod or to produce a different kind of whip.

In the preferred embodiment of my invention, I join the sections 3, 4 and 5 shown in Fig. 1 by means of sleeves or ferrules 6 and 7 made of a steel that will stretch without cracking or splitting and that will not take on a permanent set when stretched by the insertion of the section ends into the sleeves or ferrules, or when flexed by the bending of the blade or rod.

The sleeves or ferrules 6 and 7 should have an internal diameter of from five ten-thousandths (.0005) to two one-thousandths (.002) of an inch less than the diameter of the rod sections they are to receive. By forcing the section ends into sleeves or ferrules having the smaller diameter indicated, the blade or rod is unitary in that the sections are held one to another with great tenacity. Such practice, however, requires, as pointed out above, a steel of special characteristics. The steel must be of such character that it can be fabricated into the sleeves or ferrules by means of high speed automatic machines; that is, it must be readily machined with a minimum of breakage of the ferrules or sleeves and without much wear on the machining tools in order that the ferrules or sleeves may be held to close tolerances, as stated above. It also must have a uniform structure so that the wall thickness or the diameter and concentricity of the holes in the sleeves or ferrules can be held to the close tolerances required.

It will be seen from the above that the steel for the sleeves must be chosen for its machining characteristics, its resilience or ability to stretch and not take on a permanent set, and its ability to withstand flexing when in use. I have found that a steel containing thirty one-hundredths (0.30) to forty one-hundredths (0.40) per cent of carbon, fifty one-hundredths (0.50) to eighty one-hundredths (0.80) per cent of manganese and three and twenty-five one-hundredths (3.25) to three and seventy-five one-hundredths (3.75) per cent of nickel meets the requirements. Such a steel is known to the trade as S. A. E. #2335.

I have found also that a steel containing thirty one-hundredths (0.30) to forty one-hundredths (0.40) of carbon and one and thirty-five one-hundredths (1.35) to one and sixty-five one-hundredths (1.65) per cent of manganese can be used for the sleeves with satisfactory results. Such a steel is known to the trade as S. A. E. X1335.

I have found that the blade or rod I have described in this specification can be assembled, by means of a suitable jig, in one operation, thereby effecting a great saving in cost. In such a jig the sleeves or ferrules are firmly held in place at the proper distances, with the respective sections held in the proper positions for entering the holes in the ferrules or sleeves when pressure from opposite ends is applied or when one end is held from moving while pressure is applied to the opposite end. Inasmuch as the sections are relatively long and springy it is necessary to provide means to confine the sections while pressure is being applied, and thus prevent them from bowing.

The extreme tip of the blade or rod is equipped with a line guiding eyelet 11 comprising a ring of glass or other suitable smooth and wear-resisting material mounted in a metal member 12 that is fastened to the blade or rod by swaging. There may be provided also on each of the section-joining sleeves or ferrules a similar line guiding eyelet 13 and 14, similar to the tip eyelet 11 held onto the sleeve by means of the metal members 12a and 12b, respectively.

The handle 2 shown in elevation in Fig. 1 is shown in section and in greater detail in Fig. 2. The socket 10 into which the enlarged base 8 of the rod snugly fits is shown attached to a frame 15, which is curved transversely to give greater rigidity to the thin metal of which it is made.

One method by which the socket 10 can be attached to the frame is shown in Fig. 2. The tube 16 of the socket is made smaller; that is, of lesser external diameter at the frame engaging end, and this smaller portion is inserted in a hole in the frame. A ring 17 is then slipped over the small portion of the socket and is held in engagement with the frame by turning over the end 18 of the socket, as by spinning, flanging or riveting. A plug 19 is inserted into the socket to close off the socket and thereby form a pocket that assists in keeping the enlarged portion 8 of the rod securely in the socket. A cork grip 20 slipped over the socket 10 completes the upper part of the handle.

The lower part of the handle is made in the same manner as just described for the upper part. The tube 22, which corresponds to the socket 10 of the upper part of the handle, does not function as a socket but is made hollow to provide lightness in weight and to save cost as well as to facilitate manufacture.

As in the case of fastening the socket 10 to the handle, the tube 22 has a smaller outside diameter at its handle end and a ring 23 and a spun over portion 24 serve to fasten the tube 22 to the handle. A cork grip 25 over the tube 22 completes the lower portion of the handle.

The middle portion of the frame 15 is provided with suitable means for holding the reel upon which the fish line is wound. The means shown in Fig. 2 comprises a ring 26, under which one end of the reel is placed, and a ring 27 at the lower portion having upon it a finger grip 28. In use, the finger grip is pulled down by the user as the handle is grasped and holds the reel in place.

It will be found, in the practice of my invention, that various departures from the foregoing description can be made; for example, the socket 10 and the tube 22 can be fastened by other means, such as by threading the smaller portions and using similarly threaded nuts to draw the socket and tube into engagement with the frame.

The construction I have described has the advantage, however, of being inexpensive. All of the parts can be turned out inexpensively and in great quantities. It also has the advantage of providing the feeding of balance and the desired degree of whippiness or flexibility, all of which is greatly desired in a fish pole.

I claim:

1. As a new article of manufacture, a blade which progressively diminishes in cross-sectional area from end to end comprising a plurality of sections, each of which is of substantially uniform cross-sectional area but of different cross-sectional area from that of the other sections, the said sections being joined in end to end and non-detachable relationship solely by interiorly stepped sleeves which embrace and grip the adjoining ends of said sections.

2. As a new article of manufacture, a blade which progressively diminishes in cross-sectional area from end to end comprising a plurality of steel rod sections, each of which is of substantially uniform cross-sectional area but of different cross-sectional area from that of the other sections, the said sections being joined in end to end and non-detachable relationship solely by interiorly stepped steel sleeves which embrace and grip the adjoining ends of said sections.

3. As a new article of manufacture, a blade which progressively diminishes in cross-sectional area from end to end comprising a plurality of steel rod sections, each of which is of substantially uniform cross-sectional area but of different cross-sectional area from that of the other sections, the said sections being joined in end to end and non-detachable relationship solely by interiorly stepped steel sleeves, the steps of which normally are of lesser interior diameter than the outer diameters of the sections which they join, and which embrace and grip the adjoining ends of said sections.

GEORGE O. BENSON.